Patented June 15, 1937

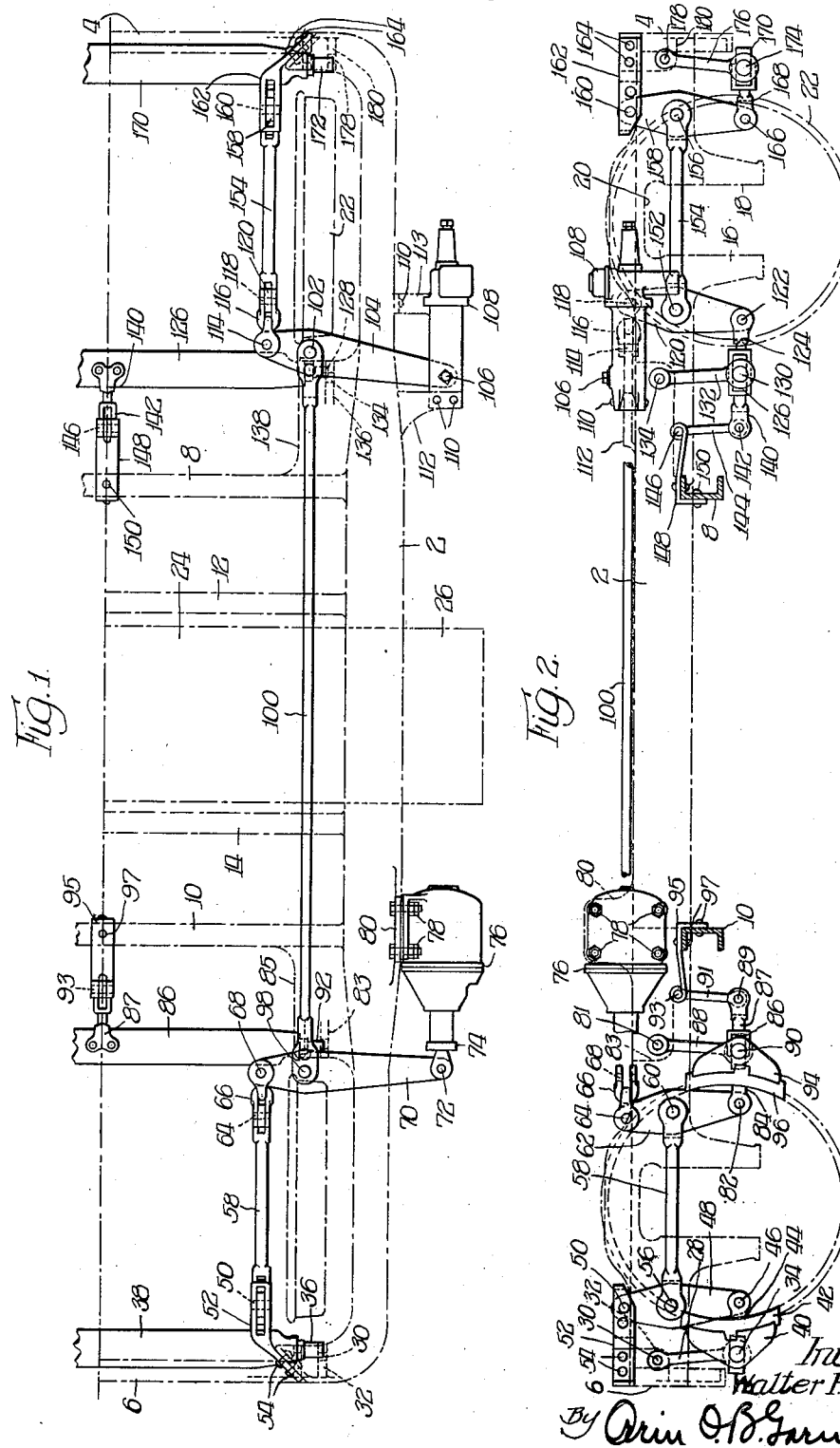
June 15, 1937. W. H. BASELT 2,084,073
CLASP BRAKE
Filed Sept. 28, 1936 2 Sheets-Sheet 1

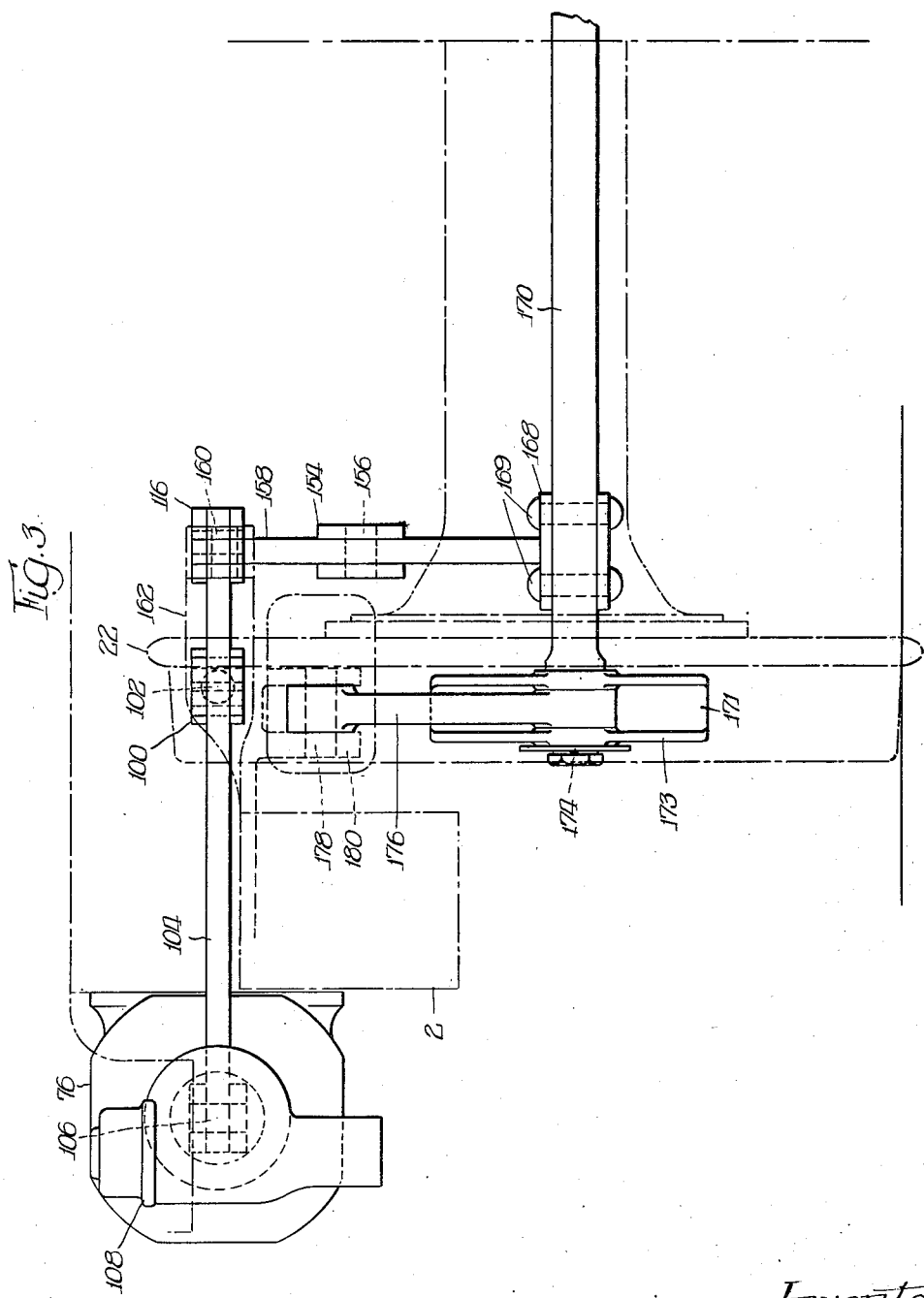

2,084,073

UNITED STATES PATENT OFFICE 2,084,073

CLASP BRAKE

Walter H. Baselt, Chicago, Ill., assignor to American Steel Foundries, Chicago, Ill., a corporation of New Jersey Application September 28, 1936, Serial No. 102,880

20 Claims. (Cl. 188—56)

My invention relates to brakes for a railway car truck and more particularly to brake rigging embodying an arrangement of brake heads and brake shoes at opposite sides of each wheel and commonly known as clasp brakes.

An object of my invention is to provide a design of clasp brake rigging particularly suitable for high-speed trains wherein the trucks are commonly arranged to provide an unusually low center of gravity.

A primary object of my invention is to provide a clasp brake rigging for a truck having an outboard side bearing, a support for said side bearing being provided on the projecting end of the load carrying member, said features being designed to accommodate a car body construction having an exceptionally low center of gravity and a long wheel base.

A further object of my invention is to provide a clasp brake rigging suitable for use on an articulated truck designed to support the adjacent ends of two car bodies and having an outboard side bearing and a long wheel base.

Yet another object of my invention is to provide a unitary clasp brake arrangement for a high-speed truck wherein a load carrying member projects outwardly of the side frame.

Still another object of my invention is to provide a simple unitary clasp brake arrangement for a high-speed truck wherein the power means may be mounted on the truck side frame adjacent one wheel and axle assembly and slack adjuster means may be mounted on said side frame adjacent the other wheel and axle assembly, both said slack adjuster means and said power means being accessible for adjustment and inspection and free of interference with said projecting load carrying member.

With these and various other objects in view, my invention may consist of certain novel features of construction and operation as will be more fully described and particularly pointed out in the specification, claims and drawings appended hereto.

In the drawings which illustrate embodiments of the device and wherein like reference characters are used to designate like parts—

Figure 1 is a top plan view of a truck and brake construction embodying my invention, only one-half of the truck and brake structure being shown inasmuch as the structure is the same on the opposite sides of the truck;

Figure 2 is a side elevation of the truck and brake construction shown in Figure 1; and Figure 3 is an end elevation of the truck and brake construction shown in Figures 1 and 2, the view being taken from the right as shown in those figures and certain parts being omitted for the sake of clarity.

The truck structure, which is of a design having an exceptionally long wheel base and low center of gravity, comprises side frames 2 integrally connected at their corresponding ends by end rails 4 and 6, and intermediate their ends by the spaced outer transoms 8 and 10 and the spaced inner transoms 12 and 14, all of said transoms being integrally formed with said side frames. Adjacent each end of each side frame are provided the column guides 16 and 18 forming therebetween the journal opening 20 within which may be received the journal box for cooperation with the journal portion (not shown) of the wheel and axle assembly 22. An intermediate bolster (not shown), generally rectangular in form, has its side members supported respectively between the transoms 8 and 12 and the transoms 10 and 14 on opposite sides of the transverse center line of the truck, said side members being joined by integrally formed end portions extending parallel with the side frames of the truck. The center bolster 24 is supported upon the said intermediate bolster and in turn supports the car body (not shown). The center bolster has the projecting ends 26 extending outwardly of the side frames 2, thus providing a support or side bearing for the car body outwardly of the side frames, thereby adding greatly to the stability of the car body, a very desirable feature in high-speed trains.

Describing the brake structure more particularly, the brake hanger 28 (Figure 2, left) is pivotally supported at its upper end as at 30 from the bracket 32 integrally formed on the end rail 6 adjacent its juncture with the side frame 2. The lower end of the hanger 28 has a pivotal connection as at 34 with the trunnion end portion 36 of the brake beam 38 and, likewise, pivotally supported on said trunnion portion is the brake head 40 and its associated brake shoe 42 arranged for cooperation with the periphery of the adjacent wheel. Adjacent the end of the beam is secured the fulcrum 44 having a pivotal connection as at 46 with the lower end of the dead truck lever 48, the upper end of said dead truck lever having a pivotal and adjustable connection as at 50 with the angular bracket 52, said bracket being secured to the end rail 6 as by means of the rivets 54—54. Intermediate its ends, the dead truck lever 48 has a pivotal connection as at 56 with the pull rod 58, the opposite end of said pull rod having a pivotal connection as at 60 with a point intermediate the ends of the live lever 62, the upper end of said live lever having a pivotal connection as at 64 to the clevis means 66, the opposite end of said clevis means having a pivotal connection as at 68 to the inner end of the cylinder lever 70. The outer end of the cylinder lever 70 has a pivotal connection as at 72 to the piston 74 of the power means or brake cylinder 76. The brake cylinder 76 is secured as by means of the bolt and nut assemblies 78 to the bracket 80 integrally formed on the side frame 2.

The lower end of the live truck lever 62 has a pivotal connection as at 82 to the fulcrum 84 secured on the brake beam 86 adjacent an end thereof. The lower end of the hanger 88 is pivotally connected as at 90 to the trunnion end 92 of the brake beam 86 and, also, at the pivotal point 90, is supported the brake head 94 with its associated brake shoe 96 arranged for cooperation with the opposite side of the before-mentioned wheel. The upper end of the hanger 88 is pivotally connected as at 81 to the bracket 83 integrally formed with the gusset 85 reinforcing the juncture of the side frame 2 and the transom 10.

At its mid-point the brake beam 86 is provided with the fulcrum 87, said fulcrum having a pivotal connection as at 89 to the balance hanger 91, the upper end of said balance hanger having a pivotal connection as at 93 to the spring bracket 95 which is secured to the transom 10 as by rivets 97—97.

Intermediate the ends of the cylinder lever 70 as at 98 is pivotally and adjustably connected the pull rod 100, the opposite end of said pull rod having a pivotal and adjustable connection as at 102 to a point intermediate the ends of the dead slack adjuster lever 104. The outer end of the slack adjuster lever 104 is pivotally and adjustably fulcrumed as at 106 to the slack adjuster 108, said slack adjuster being secured as by rivet means 110 to the brackets 112 and 113 integrally formed on the side frame 2. The inner end of the slack adjuster lever 104 is pivotally connected as at 114 to the clevis means 116, the opposite end of said clevis means having a pivotal connection as at 118 to the upper end of the live truck lever 120, the lower end of said live truck lever having a pivotal connection as at 122 to the fulcrum 124 which is secured to the beam 126 adjacent an end thereof. The trunnion end 128 of the brake beam 126 has a pivotal connection as at 130 to the lower end of the hanger 132, the upper end of said hanger having a pivotal connection as at 134 with the supporting bracket 136 integrally formed with the gusset 138 forming a reinforcement at the juncture of the transom 8 with the side frame 2. At its mid-point the brake beam 126 has the fulcrum 140 having a pivotal connection as at 142 to the lower end of the balance hanger 144, the upper end of said balance hanger having a pivotal connection as at 146 to the spring bracket 148 which is secured to the transom 8 as by the rivet means 150.

At a point intermediate the ends of the live truck lever 120 as at 152 is pivotally connected the pull rod 154, the opposite end of said pull rod having a pivotal connection as at 156 to a point intermediate the ends of the dead truck lever 158, the upper end of said dead truck lever being pivotally and adjustably supported as at 160 from the angular bracket 162 which is secured on the end rail 4 adjacent an end thereof as by the rivet means 164. The lower end of the dead truck lever 158 has a pivotal connection as at 166 to the fulcrum 168 which is secured to the brake beam 170 adjacent an end thereof as by means of rivets 169 (Figure 3). At the trunnion end 172 of the brake beam 170 is pivotally connected as at 174 the lower end of the hanger 176, the upper end of said hanger being pivotally supported as at 178 from the bracket 180 integrally formed on the end rail 4 adjacent its juncture with the side frame 2.

For the sake of clarity the brake heads and brake shoes on the ends of the brake beams 126 and 170 are omitted from Figure 2. The arrangement of these brake heads and brake shoes is the same as that shown at the opposite end of the truck and associated with the brake beams 38 and 86. An elevation view of the brake head and brake shoe is shown in Figure 3 where the brake head 171 and its associated brake shoe 173 are shown mounted upon the trunnion end 172 of the beam 170.

In operation, actuation of the power means 76 moves the piston 74 to the left (Figure 1) thus rotating the cylinder lever 70 in a clockwise direction about the pivot 93 intermediate its ends, and through the clevis connection 66 causing the live truck lever 62 to rotate in a clockwise direction about the pivot 60 intermediate its ends, thus moving the brake beam 86 to the left and bringing the brake shoe 96 supported thereon into engagement with the periphery of the adjacent wheel. Continued actuation causes the live truck lever 62 to rotate in a clockwise direction about the pivot 82 at its lower end, thus moving the pull rod 58 to the right and causing the dead truck lever 48 to rotate in a counter-clockwise direction about the point of support 50 at its upper end, thus moving the brake beam 38 to the right until the brake shoe 42 supported thereon is brought into engagement with the opposite periphery of said wheel. Continued actuation of the power means causes the cylinder lever 70 to rotate in a clockwise direction about the pivot 68 at its inner end, thus moving the pull rod 100 to the left and causing the dead slack adjuster lever 104 to rotate in a counter-clockwise direction about the pivot 106 at its outer end, and through the clevis connection 116 causing the live truck lever 120 to rotate in a counter-clockwise direction about the point 152 intermediate its ends and moving the brake beam 126 to the right until the brake shoe supported on the end thereof is brought into engagement with the periphery of the adjacent wheel. Continued actuation of the power means causes the live truck lever 120 to pivot in a counter-clockwise direction about the point 122 at its lower end, thus moving the pull rod 154 to the left and rotating the dead truck lever 158 in a clockwise direction about its pivotal point of support 160 and causing the brake beam 170 to move to the left until the brake shoe supported on the end thereof is brought into engagement with the opposite periphery of said last mentioned wheel.

Release of the power means 76 causes the brake parts to move in the reverse directions to those indicated until they have assumed their normal inoperative position. It will be understood, of course, that the operation of the various parts of the rigging occurs substantially simultaneously and not successively as above described, said method of description being followed for the sake of simplicity.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a four wheel railway car truck the combination of a truck frame comprising side frames, wheel and axle assemblies, spaced load carrying members extending between and integrally formed with said side frames, a bolster supported between said load carrying members and extending outwardly of said side frames, power means and slack adjusting means mounted on each of said side frames at opposite sides of said extending bolster, horizontal live and dead levers connected respectively to said power means and said slack adjuster means for each side frame and connected to each other, brake heads and brake beams supported on opposite sides of each of said assemblies, live and dead truck levers associated with each wheel and connected respectively to the beams at opposite sides of each wheel and to each other, and operative connections between the live truck levers at one end of said truck and said live horizontal levers, and between the live truck levers at the opposite end of said truck and said dead horizontal levers.

2. In a brake rigging for a four wheel railway car truck the combination of a truck frame comprising side frames, wheel and axle assemblies, transoms integrally connecting said side frames, a bolster supported between said transoms and having ends extending outwardly of said side frames, power means and slack adjuster means mounted on each of said side frames on opposite sides of said projecting ends, brake heads and brake beams supported on opposite sides of each wheel and axle assembly, live and dead truck levers for each wheel, said truck levers being operatively connected to each other and to the beams at opposite sides of each wheel, and live and dead horizontal levers supported intermediate the wheels and having an operative connection intermediate their ends, said horizontal levers having their inner ends connected respectively to said live truck levers and their outer ends connected respectively to said power means and to said slack adjuster means.

3. In a railway car truck the combination of a truck frame comprising side frames, wheel and axle assemblies, spaced load carrying members, a bolster supported between said load carrying members, power means and slack adjuster means mounted on each side frame adjacent the opposite ends thereof, a live horizontal lever associated with each of said power means and a dead horizontal lever associated with each of said slack adjuster means, pull rods connecting said live and dead horizontal levers for each side frame, brake beams supported on opposite sides of each of said assemblies, and live and dead truck levers operatively connected together for each wheel, the live truck levers associated with one of said assemblies having their lower ends fulcrumed from a beam intermediate the wheels and their upper ends connected to said live horizontal levers and the live truck levers associated with the other of said assemblies having their lower ends fulcrumed from the other beam intermediate the wheels and their upper ends operatively connected to said dead horizontal levers.

4. In a four wheel railway car truck the combination of a truck frame comprising side frames, wheel and axle assemblies, transverse load carrying members integrally formed with said frames, a bolster supported between said load carrying members and having ends projecting outwardly of said side frames, power means and slack adjuster means mounted on each of said side frames and spaced from said projecting ends, and brake rigging comprising brake beams supported at opposite sides of each of said assemblies, live and dead horizontal levers having their outer ends connected respectively to said power means and to said slack adjuster means for each side frame and connected intermediate their ends to each other, and operative connections between the brake beams intermediate the wheels and said horizontal levers.

5. In a four wheel railway car truck the combination of a truck frame comprising side frames, wheel and axle assemblies, transverse load carrying members integrally formed with said frames, a bolster supported between said load carrying members and having ends projecting outwardly of said side frames, power means and slack adjuster means mounted on each of said side frames and spaced from said projecting ends, and brake rigging comprising brake beams supported at opposite sides of each of said assemblies, live and dead horizontal levers having their outer ends connected respectively to said power means and to said slack adjuster means for each side frame and connected intermediate their ends to each other, and operative connections between the brake beams associated with each wheel and axle and between said horizontal levers and the respective beams intermediate the wheels.

6. In a four wheel railway car truck the combination of a truck frame comprising a side frame, wheel and axle assemblies, power means mounted on said side frame adjacent an end thereof, a slack adjuster mounted on said side frame adjacent the opposite end, hangers supporting brake heads and brake shoes on opposite sides of each of said assemblies, live and dead truck levers associated with each wheel, said levers having their lower ends fulcrumed from the beams at opposite sides of each wheel and points intermediate their ends connected to each other, one of said live levers being connected to the inner end of a cylinder lever and the other of said live levers being connected to the inner end of the slack adjusting lever, the outer end of said cylinder lever being connected to said power means and the outer end of said slack adjusting lever being connected to said slack adjuster, and a pull rod connecting said cylinder lever and said slack adjusting lever.

7. In a four wheel railway car truck the combination of a truck frame comprising a side frame, wheel and axle assemblies, power means mounted on said side frame adjacent an end thereof, a slack adjuster mounted on said side frame adjacent the opposite end, hangers supporting brake heads and brake shoes on opposite sides of each of said assemblies, live and dead truck levers associated with each wheel, said levers having their lower ends fulcrumed from the beams at opposite sides of each wheel and points intermediate their ends connected to each other, one of said live levers being connected to the inner end of a cylinder lever and the other of said live levers being connected to the inner end of the slack adjusting lever, the outer end of said cylinder lever being connected to said power means and the outer end of said slack adjusting lever being connected to said slack adjuster, and a pull rod connecting said cylinder lever and said slack adjusting lever, said pull rod being disposed within vertical planes defined by said wheels.

8. In a four wheel railway car truck the combination of a truck frame comprising a side frame, wheel and axle assemblies, power means mounted on said side frame adjacent an end thereof, a slack adjuster mounted on said side frame adjacent the opposite end, hangers supporting brake heads and brake shoes on opposite sides of each of said assemblies, live and dead truck levers associated with each wheel, said levers having their lower ends fulcrumed from the beams at opposite sides of each wheel and points intermediate their ends connected to each other, one of said live levers being connected to the inner end of a cylinder lever and the other of said live levers being connected to the inner end of the slack adjusting lever, the outer end of said cylinder lever being connected to said power means and the outer end of said slack adjusting lever being connected to said slack adjuster, a pull rod connecting said cylinder lever and said slack adjusting lever, and balance hangers supporting the brake beams intermediate said wheels.

9. In a railway car truck the combination of a truck frame comprising side frames, wheel and axle assemblies, integrally formed load carrying members connecting said side frames, a bolster supported between said load carrying members and extending outwardly of said side frames, power means and slack adjusting means mounted on each of said side frames adjacent the opposite ends thereof, live and dead horizontal levers for each side frame, said horizontal levers being connected to each other and to said power means and to said slack adjusting means respectively, live and dead truck levers connected to each other adjacent each wheel, said live truck levers being fulcrumed from beams intermediate the wheels and said dead truck levers being fulcrumed from beams outwardly of the wheels, and operative connections between said live horizontal levers and said live truck levers at one end of said truck and between said dead horizontal levers and said live truck levers at the opposite end of said truck.

10. In a railway car truck the combination of a truck frame comprising side frames, wheel and axle assemblies, integrally formed load carrying members connecting said side frames, power means and slack adjusting means mounted on each of said side frames adjacent the opposite ends thereof, live and dead horizontal levers for each side frame, said horizontal levers being connected to each other and to said power means and to said slack adjusting means respectively, live and dead truck levers connected to each other adjacent each wheel, said live truck levers being fulcrumed from beams intermediate the wheels and said dead truck levers being fulcrumed from beams outwardly of the wheels, and operative connections between said live horizontal levers and said live truck levers at one end of said truck and between said dead horizontal levers and said live truck levers at the opposite end of said truck.

11. In a railway car truck the combination of a truck frame comprising side frames, wheel and axle assemblies, integrally formed load carrying members connecting said side frames, a bolster supported between said load carrying members and extending outwardly of said side frames, power means and slack adjusting means mounted on each of said side frames on opposite sides of said outwardly extending bolster, live and dead horizontal levers for each side frame, said horizontal levers being connected to each other and to said power means and to said slack adjusting means respectively, live and dead truck levers connected to each other adjacent each wheel, said live truck levers being fulcrumed from beams intermediate the wheels and said lead truck levers being fulcrumed from beams outwardly of the wheels, and operative connections between said live horizontal levers and said live truck levers at one end of said truck and between said dead horizontal levers and said live truck levers at the opposite end of said truck.

12. In a brake rigging for a four wheel railway car truck the combination of a truck frame comprising side frames, wheel and axle assemblies, transoms integrally connecting said side frames, a bolster supported between said transoms and having ends extending outwardly of said side frames, power means and slack adjuster means mounted on each of said side frames on opposite sides of said projecting ends, brake heads and brake beams supported on opposite sides of each wheel and axle assembly and operatively connected to each other, live and dead horizontal levers having their inner ends connected respectively to the beams intermediate the wheels and their outer ends connected respectively to said power means and to said slack adjuster means, and an operative connection between said horizontal levers.

13. In a brake rigging for a railway car truck the combination of a truck frame comprising a side frame, wheel and axle assemblies, a load carrying member having an end projecting outwardly of said side frame, power means mounted on said side frame on one side of said projecting end, a slack adjuster mounted on said side frame on the opposite side of said projecting end, hangers supporting brake heads and brake beams on opposite sides of each of said assemblies, live and dead truck levers connected to each other and to brake beams on each side of said wheel and axle assembly, a cylinder lever connected to said power means and to one of said live truck levers, a dead lever connected to said slack adjuster and to another of said live levers, and a pull rod connecting said cylinder lever and said last mentioned dead lever.

14. In a four wheel railway car truck the combination of a truck frame comprising integrally formed side frames, end members and transverse load carrying members, wheel and axle assemblies, a bolster supported between said transverse load carrying members and having an end projecting outwardly of a side frame, power means and slack adjuster means mounted adjacent the opposite ends of said last mentioned side frame on opposite sides of said projecting bolster, brake beams supported at opposite sides of each of said assemblies, live and dead truck levers associated with each wheel and operatively connected to each other intermediate their ends, and live and dead horizontal levers supported intermediate the wheels and connected respectively at their outer ends to said power means and to said slack adjuster means and operatively connected intermediate their ends to each other, said horizontal levers having their inner ends connected respectively to said live truck levers.

15. In a railway car truck the combination of a truck frame comprising side frames, wheel and axle assemblies, spaced load carrying members, a bolster supported between said load carrying members, power means and slack adjuster means mounted on each side frame adjacent the opposite ends thereof, a live lever associated with each of said power means and a dead lever associated with each of said slack adjuster means, pull rods connecting said live and dead levers for each side frame, and brake beams supported on opposite sides of each of said assemblies and operatively connected to each other, one of said beams intermediate the wheels being operatively connected adjacent its opposite ends to the inner ends of said live levers and the other of said beams intermediate the wheels being operatively connected adjacent its respective ends to said dead levers.

16. In a four wheel railway car truck the combination of a truck frame comprising a side frame, a load carrying member projecting outwardly of said side frame, power means mounted on said side frame adjacent one wheel and axle assembly, a slack adjuster mounted on said side frame adjacent the other wheel and axle assembly, hangers supporting brake heads and brake beams on opposite sides of said assemblies, live and dead truck levers connected to each other and to the beams associated with each wheel and axle assembly, a cylinder lever having its outer end connected to said power means and its inner end connected to one of said live levers, a dead horizontal lever having its outer end connected to said slack adjuster and its inner end connected to another of said live levers, and a pull rod connecting said cylinder lever and said horizontal lever.

17. In a railway car truck the combination of a truck frame comprising side frames, wheel and axle assemblies, transoms integrally connecting said side frames, a bolster supported between said transoms and extending outwardly of said side frames, power means and slack adjuster means mounted on each of said side frames adjacent the opposite ends thereof, brake heads and brake beams supported on opposite sides of each wheel and axle assembly, live and dead truck levers for each wheel, said truck levers being connected to each other and to the beams on the opposite sides of each wheel, live and dead horizontal levers having their inner ends connected respectively to said live truck levers and their outer ends connected respectively to said power means and to said slack adjuster means, and operative connections between said horizontal levers.

18. In a four wheel railway car truck the combination of a truck frame comprising integrally formed side frames, end members and transverse load carrying members, wheel and axle assemblies, a bolster supported between said transverse load carrying members and having an end projecting outwardly of a side frame, power means and slack adjuster means mounted adjacent the opposite ends of said last mentioned side frame, brake beams supported at opposite sides of each of said assemblies, live and dead truck levers associated with each wheel and operatively connected to each other intermediate their ends, and live and dead horizontal levers supported intermediate the wheels and connected respectively at their outer ends to said power means and to said slack adjuster means and operatively connected intermediate their ends to each other, said horizontal levers having their inner ends connected respectively to said live truck levers.

19. In a four wheel railway car truck the combination of a truck frame comprising integrally formed side frames, spaced load carrying members joining said side frames, a bolster supported between said load carrying members, wheel and axle assemblies, power means and slack adjuster means mounted on each of said side frames adjacent the opposite ends thereof, live and dead horizontal levers for each side frame having their ends connected respectively to said power means and said slack adjuster means and operatively connected intermediate their ends, brake beams supported on opposite sides of each of said assemblies and operatively connected to each other, and hangers supporting said beams intermediate the wheels from said load carrying members respectively.

20. In a four wheel railway car truck the combination of a truck frame comprising integrally formed side frames, spaced load carrying members joining said side frames, a bolster supported between said load carrying members, wheel and axle assemblies, power means and slack adjuster means mounted on each of said side frames adjacent the opposite ends thereof, live and dead horizontal levers for each side frame having their outer ends connected respectively to said power means and said slack adjuster means and operatively connected intermediate their ends, brake beams supported on opposite sides of each of said assemblies and operatively connected to each other, and operative connections between the beams intermediate the wheels and said horizontal levers.

WALTER H. BASELT.